United States Patent
Medero et al.

(10) Patent No.: US 10,669,205 B2
(45) Date of Patent: Jun. 2, 2020

(54) CONSTRUCTION UNITS IN FORM OF BRICKS, BLOCKS OR TILES MADE FROM RECYCLABLE MATERIALS AND BY-PRODUCTS, METHODS OF MAKING THE CONSTRUCTION UNITS AND THEIR USE

(71) Applicant: Heriot-Watt University, Edinburgh (GB)

(72) Inventors: Gabriela Medero, Edinburgh (GB); Samuel Chapman, Edinburgh (GB)

(73) Assignee: HERIOT-WATT UNIVERSITY, Edinburgh (GB)

( * ) Notice: Subject to any disclaimer, the term of this patent is extended or adjusted under 35 U.S.C. 154(b) by 65 days.

(21) Appl. No.: 15/776,189

(22) PCT Filed: Nov. 18, 2016

(86) PCT No.: PCT/GB2016/053609
§ 371 (c)(1),
(2) Date: May 15, 2018

(87) PCT Pub. No.: WO2017/085510
PCT Pub. Date: May 26, 2017

(65) Prior Publication Data
US 2019/0337854 A1  Nov. 7, 2019

(30) Foreign Application Priority Data
Nov. 20, 2015 (GB) .................................. 1520515.6

(51) Int. Cl.
| C04B 33/13 | (2006.01) |
| C04B 33/04 | (2006.01) |
| C04B 33/132 | (2006.01) |
| C04B 33/135 | (2006.01) |
| C04B 33/14 | (2006.01) |
| C04B 33/32 | (2006.01) |
| B28B 3/20 | (2006.01) |

(52) U.S. Cl.
CPC .......... *C04B 33/1315* (2013.01); *C04B 33/04* (2013.01); *C04B 33/131* (2013.01); *C04B 33/135* (2013.01); *C04B 33/1324* (2013.01); *C04B 33/14* (2013.01); *C04B 33/32* (2013.01); *B28B 3/20* (2013.01); *C04B 2235/349* (2013.01); *C04B 2235/3418* (2013.01); *C04B 2235/448* (2013.01); *C04B 2235/5427* (2013.01); *C04B 2235/5436* (2013.01); *C04B 2235/656* (2013.01)

(58) Field of Classification Search
CPC ....... C04B 33/04; C04B 33/14; C04B 33/131; C04B 33/1315; C04B 33/1324; C04B 33/135; C04B 33/32; C04B 2235/3418; C04B 2235/349; C04B 2235/448; C04B 2235/5427; C04B 2235/5436; C04B 2235/656; B28B 3/20
See application file for complete search history.

(56) References Cited

U.S. PATENT DOCUMENTS

| 4,780,144 | A | 10/1988 | Loggers |
| 5,378,279 | A * | 1/1995 | Conroy ............... C04B 20/0076 106/719 |
| 2016/0068435 | A1* | 3/2016 | Daniels ................... C04B 28/02 264/133 |
| 2016/0145153 | A1 | 5/2016 | Hwang et al. |

FOREIGN PATENT DOCUMENTS

| CN | 104230306 A | 12/2014 |
| CN | 103332949 B | 4/2015 |
| CN | 104556853 A | 4/2015 |
| CN | 104556928 A | 4/2015 |
| EP | 0729926 A1 | 9/1996 |
| GB | 11062 | 9/1908 |
| GB | 796420 A | 6/1958 |
| KR | 10-2014-011519 A * | 9/2014 |
| KR | 20140115119 A | 9/2014 |
| RU | 2378215 C2 | 1/2010 |
| RU | 2393134 C1 | 6/2010 |
| SK | 501422014 U1 | 8/2015 |
| WO | 2009005205 A1 | 1/2009 |
| WO | 2012089944 A1 | 7/2012 |
| WO | 2014157984 A1 | 10/2014 |

OTHER PUBLICATIONS

International Search Report for PCT/GB2016/053609 dated Feb. 3, 2017, 10 pages.
International Written Opinion for PCT/GB2016/053609 dated Feb. 3, 2017, 11 pages.
Jun Zhou et al.: "A Novel Two-step Hydration Process of Preparing Cement-Free Non-fired Bricks from Waste Phosphogypsum", Construction and Building Materials, vol. 73, Oct. 19, 2014 pp. 222-228.
UK IPO Search Report for Application No. GB 1520515,6 dated Jun. 9, 2017, 4 pages.
PCT International Search Report for PCT/GB2016/053609 dated Jan. 25, 2017, 8 pages.
UK IPO Examination Report for Application No. GB1619583.6 dated Dec. 11, 2017, 2 pages.

* cited by examiner

*Primary Examiner* — Anthony J Green
(74) *Attorney, Agent, or Firm* — Faegre Drinker Biddle & Reath LLP (57) ABSTRACT

The invention relates to a construction unit made from various recyclable materials, for example, from recycled waste plasterboard from the construction industry or flue-gas gypsum which is a by-product from fossil-fueled power plants. The construction units are made from a raw mix comprising gypsum, clay and aggregate and methods of making construction units. The invention also relates to a raw mix for making a construction unit; a kit including a construction unit and mortar; and uses of the construction unit to form a structure.

16 Claims, 3 Drawing Sheets

CONSTRUCTION UNITS IN FORM OF BRICKS, BLOCKS OR TILES MADE FROM RECYCLABLE MATERIALS AND BY-PRODUCTS, METHODS OF MAKING THE CONSTRUCTION UNITS AND THEIR USE

FIELD OF THE INVENTION

The present invention relates to construction units comprising gypsum, clay and aggregate; and methods of making construction units.

BACKGROUND

The making of traditional fired bricks and cement blocks for use in construction is not environmentally friendly. Producing energy for firing is expensive and impacts on the environment. Cement production also impacts on the environment. Clay and cement used in traditional bricks and blocks are also a finite resource. There is a need to recycle waste from the construction industry, as disposal of such waste is expensive and legislation (particularly in the UK) is reducing landfill allowances and increasing recycling requirements.

Alternatives to traditional fired bricks made from clay and cement-based units are therefore needed for economic as well as environmental reasons.

SUMMARY OF THE INVENTION

After conducting experiments with various recyclable materials, the inventors have found that gypsum, obtained for example, from recycled waste plasterboard from the construction industry or flue-gas gypsum which is a by-product from fossil-fueled power plants, could be used to make a construction unit.

In particular, the inventors have determined that gypsum can replace in part the clay or cement in construction units. As such, construction units comprising gypsum require less virgin materials. The resulting gypsum construction units are therefore more environmentally friendly.

Further the construction units do not require to be fired. This means less energy is needed to make the construction units. As a consequence, there is less impact on the environment, and waste can be recycled from the construction industry.

Accordingly, in its broadest aspect, the invention provides a construction unit comprising gypsum, clay and aggregate materials.

Advantageously the use of gypsum and aggregate in the construction unit replaces a proportion of the clay in the unit and the use of plasticisers such as sodium silicate provided to form traditional construction units. As the clay and sodium silicate are typically quarried they thus require energy in their extraction and deplete natural reserves as well as requiring firing in their production.

The aggregate material may be obtained from recycled inert construction and demolition waste. Suitably, around 90% of the content of the construction unit may be waste or recyclable material.

The construction unit can have an attractive appearance, for example as provided by a texture on the surface of the construction unit and/or with the colour of the construction unit. For example, the construction unit can have a smooth surface similar to that of a clay brick. Additionally or alternatively in embodiments various pigments can be incorporated into the construction unit to provide colour variants of the construction unit. These pigments can also be recyclable material in keeping with the environmental credentials of the construction unit.

Advantageously the construction units provide thermal mass and buffering of internal relative humidity.

In a first aspect, the invention provides an unfired construction unit comprising gypsum, clay and aggregate materials, wherein the construction unit does not include tar.

The construction unit may additionally not comprise: a) cement or b) organic matter.

The aggregate materials may comprise aggregate of size approximately 1 mm to 20 mm. For example, aggregate of size approximately 6-20 mm and/or aggregate of size approximately 2-6 mm. For example, a) 3-25% aggregate of size approximately 6-20 mm; and/or b) 15-40% aggregate of size approximately 2-6 mm.

All percentages are of dry mass.

In a second aspect, the invention provides a construction unit comprising gypsum, clay and aggregate materials wherein the aggregate materials comprise: a) 3-25% aggregate of size approximately 6-20 mm; and/or b) 15-40% aggregate of size approximately 2-6 mm. This construction unit may not comprise any one or more of the following: a) cement; b) organic matter or c) tar, and may be unfired.

The aggregate materials of the described construction units may comprise sand. For example, sand in the range of: a) 20-65%; b) 20-60; c) 20-55; d) 25-65 25-60%; e) 25-55%; f) 30-65%; g) 30-60%; or h) 30-55%.

The gypsum may be in the range of: a) 5-35%; b) 5-30% c) 5-25%; d) 5-20%; e) 10-35%; f) 10-30%; g) 10-25% or h) 10-20%.

Clay may be in the range of: a) 5-40%; b) 5-15%; c) 5-25% or d) 8-12%.

The aggregate materials may comprise any three or more of the following: aggregate of size approximately: a) 6-20 mm; b) 2-6 mm; c) 600 µm-2 mm; d) 200-600 µm and e) 60-200 µm, wherein the aggregate materials comprise at least one of a) or b). For example, the aggregate may have a well-graded particle distribution.

The aggregate materials of any of the described construction units may comprise:
- a) 3-20%; or b) 3-15%; or c) 3-10% aggregate of size approximately 6-20 mm; and/or
- a) 15-40%; b) 15-35%; c) 15-30%; d) 15-25%; e) 20-40%; f) 20-35% or g) 20-30% aggregate of size approximately 2-6 mm; and/or
- a) 10-40%; b) 10-35%; c) 10-30%; d) 10-25%; e) 10-20%; f) 15-40%; g) 15-35%; h) 15-30% or i) 15-25% aggregate of size approximately 600 µm-2 mm; and/or
- a) 10-30%; b) 10-25%; c) 10-20%; d) 15-30% ore) 15-25% aggregate of size approximately 200-600 µm; and/or
- a) 3-15%; b) 3-10%; c) 5-15%; or d) 5-10% aggregate of size approximately 60-200 µm.

The aggregate of size approximately 6-20 mm and/or aggregate of size approximately 2-6 mm may be gravel. The aggregate of size approximately 600 µm-2 mm; 200-600 µm and/or 60-200 µm may be sand.

Additionally, an additive, for example a pigment may be added to the construction unit.

In line with the environmental credentials of the invention, at least 90% of the construction unit may comprise waste or recyclable material.

According to third aspect of the invention, there is provided a method of making a construction unit comprising gypsum, clay and aggregate materials comprising;
a) mixing the gypsum, clay and aggregate materials together;
b) adding water to the mixed gypsum, clay and aggregate material such that water is provided in a range of 8-40% of dry mass of the mixed material;
c) compacting, compressing or extruding the mixed material from step b; and
d) allowing the mixed material from step c to dry.

The aggregate materials may comprise aggregate of size approximately 6-20 mm and/or aggregate of size approximately 2-6 mm. For example, a) 3-25% aggregate of size approximately 6-20 mm; and/or b) 15-40% aggregate of size approximately 2-6 mm.

The method may not include firing the construction units and/or the method may as a first step comprise obtaining waste gypsum destined for landfill, for example gypsum from the construction industry or flu-gas desulfurization gypsum which is a by-product of fossil-fuel power plants. Alternatively or additionally, the construction unit produced by the method may not comprise cement.

Air-drying utilises 85% less energy than methods to form fired bricks. An unfired construction unit made by the method can have less than 15% of the embodied carbon of fired clay bricks and less than 25% of the embodied carbon of lightweight block works. Using waste gypsum means avoiding the expense and environmental impact of landfill.

The gypsum may be processed to reduce its moisture content prior to mixing it with the clay and aggregate materials. For example, the moisture content of the gypsum may be reduced to form gypsum in the hemihydrate state. This can be done by heating or pressurisation. With regards to heating, the gypsum may be heated at approximately 80-200° C. For example, the gypsum may be heated at approximately 150° C. for approximately 24 hours.

The construction unit produced by the method may not comprise: a) organic matter or b) tar.

The aggregate materials used in the method may comprise sand. For example, sand in the range of: a) 20-65%; b) 20-60%; c) 20-55%; d) 25-65%; e) 25-60%; f) 25-55%; g) 30-65%; h) 30-60%; or i) 30-55%.

The gypsum may be in the range of: a) 5-35%; b) 5-30% c) 5-25%; d) 5-20%; e) 10-35%; f) 10-30%; g) 10-25% or h) 10-20%.

Clay may be in the range of: a) 5-40%; b) 5-35%; c) 5-30%; d) 5-25%; e) 5-20%; f) 5-15%; g) 8-20%; h) 8-15%; or i) 8-12%.

The aggregate materials may comprise any three or more of the following: aggregate of size approximately: a) 6-20 mm; b) 2-6 mm; c) 600 μm-2 mm; d) 200-600 μm and e) 60-200 μm, wherein the aggregate materials comprise at least one of a) or b). For example, the aggregate may have a well-graded particle distribution.

The aggregate materials used in the method may comprise:
a) 3-20%; or b) 3-15%; or c) 3-10% aggregate of size approximately 6-20 mm; and/or
a) 15-40%; b) 15-35%; c) 15-30%; d) 15-25%; e) 20-40%; f) 20-35% or g) 20-30% aggregate of size approximately 2-6 mm; and/or
a) 10-40%; b) 10-35%; c) 10-30%; d) 10-25%; e) 10-20%; f) 15-40%; g) 15-35%; h) 15-30% or i) 15-25% aggregate of size approximately 600 μm-2 mm.; and/or
a) 10-30%; b) 10-25%; c) 10-20%; d) 15-30% ore) 15-25% aggregate of size approximately 200-600 μm; and/or
a) 3-15%; b) 3-10%; c) 5-15%; or d) 5-10% aggregate of size approximately 60-200 μm.

The aggregate of size approximately 6-20 mm and/or aggregate of size approximately 2-6 mm may be gravel. The aggregate of size approximately 600 μm-2 mm; 200-600 μm and/or 60-200 μm may be sand.

Pigment is optionally mixed with the gypsum, clay and aggregate materials.

In the method, at least 90% of the construction unit may comprise waste or recyclable material.

The invention also provides a construction unit obtained or obtainable by the above method.

According to a fourth aspect of the present invention, there is provided use of the construction unit to form a structure.

According to a fifth aspect of the present invention, there is provided a kit comprising at least one construction unit of the present invention and an ecological mortar. The ecological mortar may be a lime mortar.

Finally, according to a sixth aspect of the invention, there is also provided a raw mix for making an unfired brick comprising gypsum, clay and aggregate materials wherein the aggregate materials comprise: a) 3-25% aggregate of size approximately 6-20 mm; and/or b) 15-40% aggregate of size approximately 2-6 mm; and c) sand. The raw mix may not comprise any one or more of the following: a) cement; b) organic matter or c) tar.

Sand may be in the range of: a) 20-65%; b) 20-60%; c) 20-55%; d) 25-65%, e) 25-60%; f) 25-55%; g) 30-65%; h) 30-60%; or i) 30-55%.

The gypsum may be in the range of: a) 5-35%; b) 5-30% c) 5-25%; d) 5-20%; e) 10-35%; f) 10-30%; g) 10-25% or h) 10-20%.

Clay may be in the range of: a) 5-40%; b) 5-15%; c) 5-25% or d) 8-12%.

The aggregate materials may comprise any three or more of the following: aggregate of size approximately: a) 6-20 mm; b) 2-6 mm; c) 600 μm-2 mm; d) 200-600 μm and e) 60-200 μm, wherein the aggregate materials comprise at least one of a) or b). For example, the aggregate may have a well-graded particle distribution.

The aggregate materials of the raw mix may comprise:
a) 3-20%; or b) 3-15%; or c) 3-10% aggregate of size approximately 6-20 mm; and/or
a) 15-40%; b) 15-35%; c) 15-30%; d) 15-25%; e) 20-40%; f) 20-35% or g) 20-30% aggregate of size approximately 2-6 mm; and/or
a) 10-40%; b) 10-35%; c) 10-30%; d) 10-25%; e) 10-20%; f) 15-40%; g) 15-35%; h) 15-30% or i) 15-25% aggregate of size approximately 600 μm-2 mm; and/or
a) 10-30%; b) 10-25%; c) 10-20%; d) 15-30% or e) 15-25% aggregate of size approximately 200-600 μm; and/or
a) 3-15%; b) 3-10%; c) 5-15%; or d) 5-10% aggregate of size approximately 60-200 μm.

The aggregate of size approximately 6-20 mm and/or aggregate of size approximately 2-6 mm may be gravel. The aggregate of size approximately 600 μm-2 mm; 200-600 μm and/or 60-200 μm may be sand.

Additionally, an additive, for example a pigment may be added to the raw mix.

In line with the environmental credentials of the invention, at least 90% of the raw mix may comprise waste or recyclable material.

BRIEF DESCRIPTION OF THE DRAWINGS

An embodiment of the invention will now be described with reference to the accompanying figures in which.

DETAILED DESCRIPTION OF THE INVENTION

Construction Unit

Construction units are compressed or compacted masses of material made by extrusion or moulding. The construction unit of the present invention comprising gypsum, clay and aggregate material may be any size or shape. Examples of construction units include bricks, blocks and tiles.

A construction unit may be a brick provided as a rectangular-shaped block which can be similar in size to those bricks used in construction. For example, in the UK, the standard brick size is approximately 215 mm (length)×102.5 mm (width)×65 mm (height) in size. In the United States, modern standard bricks sizes (controlled by American Society for Testing and Materials ASTM) are about 8×3⅝×2¼ inches (203 mm×92 mm×57 mm (length×width×height)). The more commonly used brick size in the United States (also called the modular brick) is about 7⅝×3⅝×2¼ inches (194 mm (length)×92 mm (width)×57 (height) mm). In Europe, the European Brick (EF) measures approximately 240 mm (length)×100 mm (width)×71 mm (height).

Gypsum

Gypsum is a soft sulphate mineral composed of calcium sulphate dihydrate, with the chemical formula $CaSO_4 \cdot 2H_2O$.

Heating gypsum to between 100° C. and 150° C. (302 F) partially dehydrates the mineral by driving off approximately 75% of the water contained in its chemical structure. The partially dehydrated mineral is called calcium sulphate hemihydrate or calcined gypsum (commonly known as plaster of Paris). The dehydration (specifically known as calcination) begins at approximately 80 C (176 F), although in dry air, some dehydration will take place already at 50 C. Calcined gypsum has an unusual property: when mixed with water at normal (ambient) temperatures, it quickly reverts chemically to the preferred dehydrate dihydrate form, while physically "setting" to form a rigid and relatively strong gypsum crystal lattice.

In the building industry, this calcined gypsum or gypsum mortar as it is commonly known can be mixed with water to form a paste which is then spread and sandwiched between layers of facing paper to form gypsum board or plaster board. When the paste sets and hardens, it has effectively reverted back to being gypsum rock as explained above.

Any form of gypsum, including any form of recycled gypsum or any form of raw unprocessed gypsum, can be utilised in the method of the present invention or in the construction unit of the present invention. The gypsum can be natural, mined gypsum or synthetic gypsum. An example of synthetic gypsum is Flue-Gas Desulferization gypsum which is a by-product of desulfurization of flue gas from the stacks of fossil-fueled power plants. Use of this type of gypsum reduces environmental pollution due to reducing requirements for natural gypsum. Other waste or by-product gypsum can also be used.

Preferably, the gypsum used is gypsum recycled from waste from the construction industry, for example, from waste plasterboard. If waste plasterboard is used to make the construction unit, the waste plasterboard can be suitably pre-treated/re-processed before being added to the construction unit. Suitably, consistent and verifiable quality of re-processed gypsum may be used. This can for example be achieved by only using The British Standard Institution's specification PAS 109:2013 which also ensures defined grades of re-processed gypsum. Briefly, the British Standard Specification PAS 109:2013 involves separating the waste gypsum into defined particle sizes, and checking the purity of the waste gypsum mix.

In addition to this processing defined in the British Standard Specification PAS 109:2013, the waste gypsum can undergo further pre-treatment before being used in the method for making a construction unit. The waste gypsum may be sieved. For example, the gypsum may be sieved through a 600 μm sieve. The gypsum retained on the 600 μm sieve may be discarded. That is, only the gypsum particles of less than 600 μm may be used in the construction unit.

Preferably, the gypsum is processed to reduce the moisture content. Typically, the gypsum is obtained in the dihydrate form $(CaSO_4(H_2O)_2)$. Preferably the moisture content of the gypsum is reduced to where the gypsum is in the hemihydrate state $(CaSO_4(H_2O)_{0.5})$. Lowering the moisture content of the waste gypsum improves its microstructure properties resulting in a smaller void fraction. Lowering the moisture content also improves the workability of the gypsum as it takes longer to harden once mixed with the other components of the construction unit. This allows a better mix with the other components resulting in better bonding of the components which in turn also results in better mechanical properties and improved strength of the construction unit.

To reduce the moisture content, the gypsum may be heated at between a) 80-250° C.; or b) 100-200° C. For example, the gypsum may be heated at approximately 150° C. for approximately 24 hours; or a higher temperature, for example 200° C., could be used for less than 24 hours.

Alternatively or additionally, pressure may be used to reduce the moisture content of the gypsum.

Gypsum in its hemihydrate form has lost 75% of its water content. Therefore, to test if the gypsum has reached its hemihydrate state, the gypsum may be weighed before and after heat and/or pressure treatment. The water loss of the gypsum based on the weight loss after treatment can then be calculated.

In embodiments the construction unit can comprise gypsum in a quantity of 5%, 6% 7%, 8%, 9%, 10%, 11%, 12%, 13%, 14%, 15%, 16%, 17%, 18%, 19%, 20%, 21%, 22%, 23%, 24%, 25%, 26%, 27%, 28%, 29%, 30%, 31%, 32%, 33%, 34% or 35% of the construction unit by dry mass. In embodiments, 5-35%; 5-30%; 5-25%; 5-20%; 5-15%; 10-35%; 10-30%; 10-25%; 10-20%; 15-35%; 15-30% or 15-25% by dry mass of the construction unit can comprise gypsum. In embodiments 10 or 15% by dry mass of the construction unit can be gypsum.

An example of possible component gypsum proportions in dry mass is provided below. The determination of dry mass would be suitable as discussed at other parts of the description:

Percentage by dry mass of gypsum=$m/M \times 100 = 15\%$

Where:
Dry mass of gypsum (m)=405 g
Total dry mass of construction unit (M)=2700 g Clay Clay is a natural soil material that comprises one or more minerals. These minerals can comprise hydrous aluminium phyllosilicates. Additionally, clay may comprise metal oxides.

Clay for use in the construction units of the present invention can be obtained from natural deposits. Alternatively, or additionally, recycled clay soil may be used.

In embodiments the construction unit can comprise clay in a quantity of 5%, 6%, 7%, 8%, 9%, 10%, 11%, 12%, 13%, 14%, 15%, 16%, 17%, 18%, 19%, 20%, 21%, 22%, 23% 24%, 25%, 26%, 27%, 28%, 29%, 30%, 31%, 32%, 33%, 34%, 35%, 36%, 37%, 38%, 39% or 40% of the construction unit by dry mass. In embodiments, the construction unit can comprise in the range of 5-40%; 5-35; 5-30%; 5-25; 5-20%; 5-15%; 8-20%; 8-15; 8-12%; 5-40%; 5-30%; 5-20%; 5% to 15%; 10-40%; 10-30%; or 10-20% clay. In embodiments the construction unit can comprise about 10% clay by dry mass in the construction unit. 10% clay is preferred as this provides the necessary attractive particle charges within the mixture and achieves well-graded particle size distribution of the materials in the mixture. In embodiments, the clay can be soil that has been formally classified as clay.

Aggregate Material

Aggregate material for use in the construction unit can comprise pieces of crushed stone (i.e. gravel and sand). In use, in forming the construction unit, the aggregate material intersperses between the gypsum and clay. As will be appreciated, aggregate of different dimensions can be utilised to give the necessary strength to the construction unit. Once the brick is produced, it can be crushed and the aggregates within the mixture can be separated and measured and potentially re-used for another application or brick.

The size of aggregate material can vary. For example, the aggregate can be below 1 mm in largest cross-sectional width or 5, 10, 15, 20 mm in cross-sectional width.

The nomenclature used, for example fine gravel and medium gravel, is with reference to the British Soil Classification System. According to this classification system:
Medium gravel is in the range 6-20 mm.
Fine gravel is in the range 2-6 mm.
Coarse sand is in the range of 600 μm-2 mm.
Medium sand is in the range of 200-600 μm.
Fine sand is in the range of 60-200 μm.
This classification is also shown in FIG. 4. The size refers to cross-sectional width.

The aggregate material may be provided by aggregate of size approximately 1 mm to 20 mm. For example, the aggregate materials may comprise the following two sizes of aggregate: aggregate of size approximately 6-20 mm and/or aggregate of size approximately 2-6 mm.

The aggregate of approximate size 6-20 mm can be in a quantity of 3%, 4%, 5%, 6%, 7% 8% 9% 10% 11% 12% 13% 14% 15% 16% 17% 18% 19% 20% 21%, 22%, 23% 24%, or 25%. For example, the aggregate of approximate size 6-20 mm may be used at a range of 3-25%; 3-20%; 3-15%; 3-10%; 5-25%; 5-20%; 5-15%; 7-25%; 7-20%; 7-15%; 7-10%; 10-25%; 10-20%; or 10-15%. The aggregate of size 6-20 mm may be medium gravel.

The aggregate of approximate size 2-6 mm can be in a quantity of 15%, 16%, 17%, 18%, 19%, 20%, 21%, 22%, 23% 24%, 25%, 26%, 27%, 28%, 29%, 30%, 31%, 32%, 33%, 34%, 35%, 36%, 37%, 38%, 39% or 40%. For example, the aggregate of approximate size 2-6 mm can be used at a range of 15-40%; 15-35%; 15-30%; 15-25%; 20-40%; or 20-30%. The aggregate of size 2-6 mm may be fine gravel.

Sand may also be added in a quantity of 20%, 21%, 22%, 23% 24%, 25%, 26%, 27%, 28%, 29%, 30%, 31%, 32%, 33%, 34%, 35%, 36%, 37%, 38%, 39%; 40%; 41%, 42%, 43%, 44%, 45%, 46%, 47%, 48%, 49%, 50%, 51%, 52%, 53%, 54%, 55%, 56%, 57%, 58%, 59%, 60%, 61%, 61%, 62%, 63%, 64% or 65%. For example aggregate, the sand can be used at a range of 20-65%; 20-60%; 20-55%; 20-50%; 25-65%; 25-60%; 25-55%; 25-50%; 30-65%; 30-60%; 30-55%; 30-50%; 35-65%; 35-60%; 35-55% or 35-50%.

Figure 2:
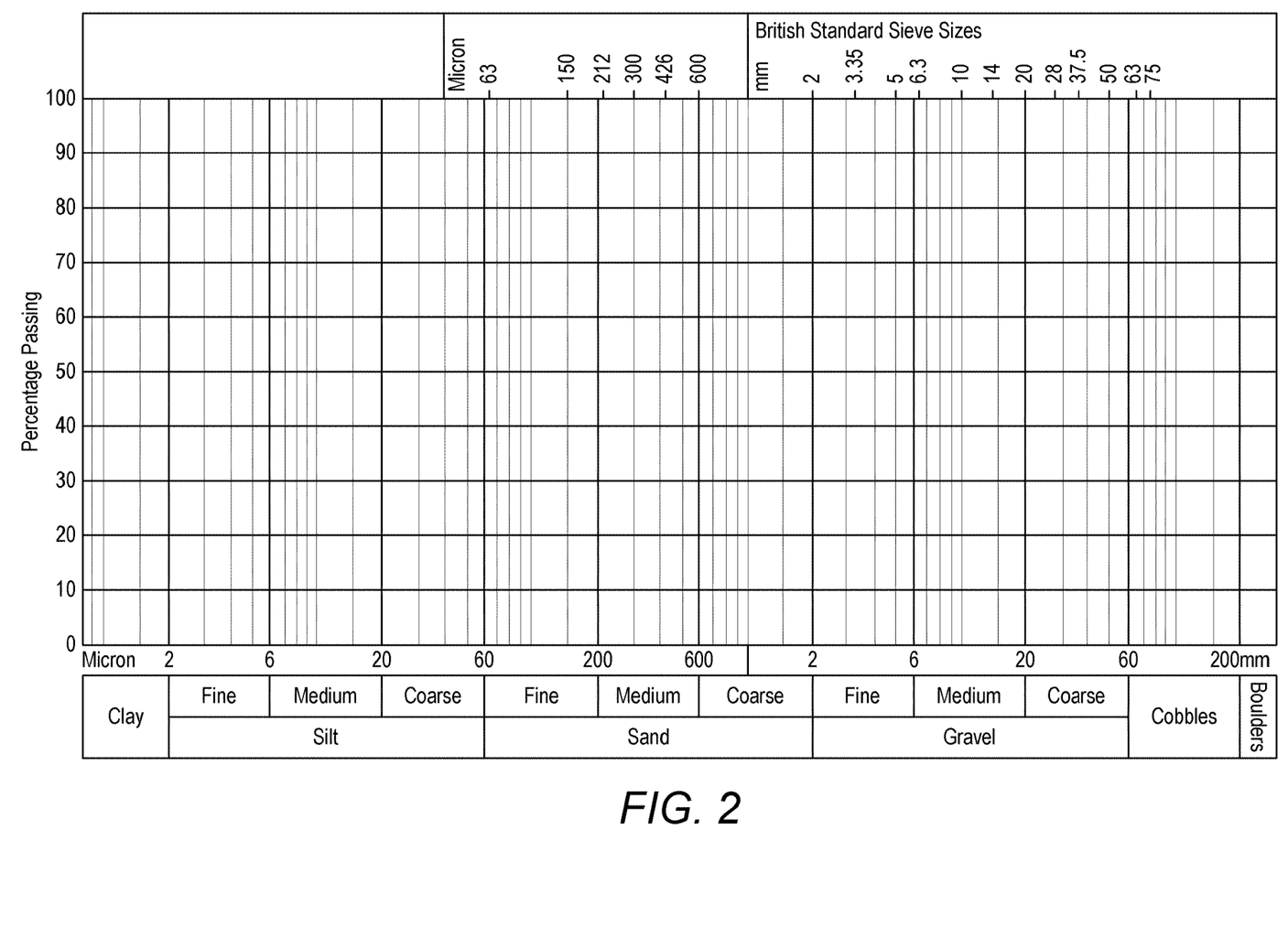
FIG. 2 provides a graph of aggregate size according to the British Soil Classification System.

The sand may be coarse, medium and/or fine sand. These definitions are also from the British Soil Classification System as shown in FIG. 2 and as described below:
Coarse sand is in the range 600 μm-2 mm.
Medium sand is in the range 200-600 μm.
Fine sand is in the range 60-200 μm.

A mixture of two or more sizes of sand may be used. For example, 10-40% of coarse sand, 10-30% medium sand and/or 3-15% fine sand to obtain sand in a quantity of 20-65% by dry mass in the construction unit. For example,
Coarse sand in a quantity of 10%, 11%, 12%, 13%, 14%, 15%, 16%, 17%, 18%, 19%, 20%, 21%, 22%, 23% 24%, 25%, 26%, 27%, 28%, 29%, 30%31%, 32%, 33%, 34%, 35%, 36%, 37%, 38%, 39% or 40%. For example, at a range of 10-40%; 10-35%; 10-30%; 10-25%; 10-20%; 15-40%; 15-35%; 15-30%; 15-25%; and/or
Medium sand in a quantity of 10%, 11%, 12%, 13%, 14%, 15%, 16%, 17%, 18%, 19%, 20%, 21%, 22%, 23% 24%, 25%, 26%, 27%, 28%, 29% or 30%. For example, at a range of 10-30%; 10-25%; 10-20%; 15-30% or 15-25%; and/or
Fine sand in a quantity of 3%, 4%, 5%, 6%, 7%, 8%, 9%, 10%, 11%, 12%, 13%, 14% or 15%. For example, at a range of 3-15%; 3-10%; 5-15%; or 5-10%.

Therefore, the aggregate materials may comprise a mix of aggregate of approximate size:
6-20 mm at a range of 3-25%; 3-20%; 3-15%; 3-10%; 5-25%; 5-20%; 5-15%; 7-25%; 7-20%; 7-15%; 7-10%; 10-25%; 10-20%; or 10-15%; and/or
2-6 mm at a range of 15-40%; 15-35%; 15-30%; 15-25%; 20-40%; or 20-30%; and/or
Sand (coarse, medium and/or fine) at a range of 20-65%; 20-60%; 20-55%; 20-50%; 25-65%; 25-60%; 25-55%; 25-50%; 30-65%; 30-60%; 30-55%; 30-50%; 35-65%; 35-60%; 35-55% or 35-50%.

Figure 3:
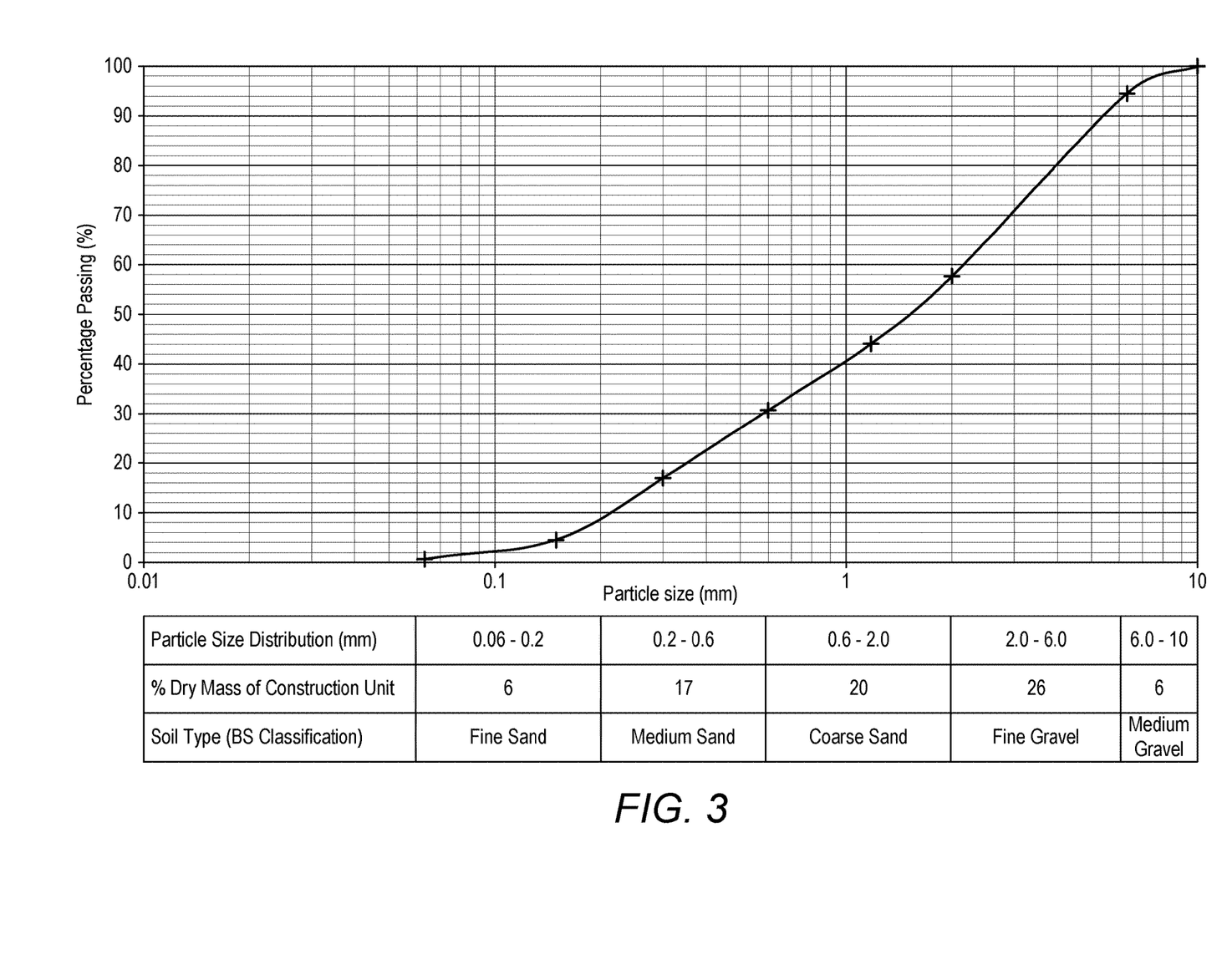
FIG. 3 provides a graph showing a brick with an optimum aggregate particle size distribution.

A well-graded particle distribution can be seen in FIG. 3. This is where plotting the aggregate particle size against the percentage passing results in a curve which is generally constant over the full range of particle sizes such that there is no deficiency or excess of any particular aggregate particle size. [The typical method of obtaining particle size distribution of aggregates is undertaken by shaking a dried sample of the material through a set of sieves and recording the mass retained in each sieve. The classification system adopted by the British Standards Institute is the MIT (Massachusetts Institute of technology) system. The percentage passing is the percentage of the total mass that have passed through an individual sieve following the Standard in terms of sieves' size and order for testing]. To obtain a well-graded particle distribution, the aggregate materials used can be a mixture of three aggregate sizes. That is, aggregate of size approximately: a) 6-20 mm; b) 2-6 mm; c) 600 μm-2 mm; d) 200-600 μm and e) 60-200 μm, wherein the aggregate materials comprise at least one of a) or b).

The aggregate of approximate size 6-20 mm can be in a quantity of 3%, 4%, 5%, 6%, 7%, 8%, 9%, 10%, 11%, 12%, 13%, 14%, 15%, 16%, 17%, 18%, 19%, 20%, 21%, 22%, 23% 24%, or 25%. For example, the aggregate of approximate size 6-20 mm may be used at a range of 3-25%; 3-20%; 3-15%; 3-10%; 5-25%; 5-20%; 5-15%; 7-25%; 7-20%; 7-15%; 7-10%; 10-25%; 10-20%; or 10-15%. The aggregate of size 6-20 mm may be medium gravel.

The aggregate of approximate size 2-6 mm can be in a quantity of 15%, 16%, 17%, 18%, 19%, 20%, 21%, 22%, 23% 24%, 25%, 26%, 27%, 28%, 29%, 30%, 31%, 32%, 33%, 34%, 35%, 36%, 37%, 38%, 39% or 40%. For example, the aggregate of approximate size 2-6 mm can be used at a range of 15-40%; 15-35%; 15-30%; 15-25%; 20-40%; or 20-30%. The aggregate of size 2-6 mm may be fine gravel.

The aggregate of size 600 μm-2 mm can be in a quantity of 10%, 11%, 12%, 13%, 14%, 15%, 16%, 17%, 18%, 19%, 20%, 21%, 22%, 23% 24%, 25%, 26%, 27%, 28%, 29%, 30%, 31%, 32%, 33%, 34%, 35%, 36%, 37%, 38%, 39% or 40%, For example, the aggregate of size 600 μm-2 mm can be used at a range of 10-40%; 10-35%; 10-30%; 10-25%; 10-20%; 15-30% or 15-25%. The aggregate of size 600 μm-2 mm may be coarse sand.

The aggregate of size 200-600 μm can be in a quantity of 10%, 11%, 12%, 13%, 14%, 15%, 16%, 17%, 18%, 19%, 20%, 21%, 22%, 23% 24%, 25%, 26%, 27%, 28%, 29% or 30%. For example, the aggregate of size 200-600 μm can be used at a range of 10-30%; 10-25%; 10-20%; 15-30% or 15-25%. The aggregate of size 200-600 μm may be medium sand.

The aggregate of size 60-200 μm can be in a quantity of 3%, 4%, 5%, 6%, 7%, 8%, 9%, 10%, 11%, 12%, 13%, 14% or 15%. For example, the aggregate of size 60-200 μm can be used at a range of 3-15%; 3-10%; 5-15%; or 5-10%. The aggregate of size 60-200 μm may be fine sand.

Three or more of the above aggregates can be mixed to achieve a well-graded particle distribution in the resulting construction unit as shown in FIG. 3.

Examples of construction unit mixes include:
15% gypsum;
10% clay:
6% medium gravel (size 6-20 mm);
26% fine gravel (size 2-6 mm);
20% coarse sand (size 600 μm-2 mm);
17% medium sand (size (200-600 μm); and
6% fine sand (size 60-200 μm).

The aggregate material can be in a quantity of 60-90% of the construction unit by dry mass. For example, the aggregate material can be in a quantity of 60, 65, 70, 75, 80, 85 or 90% by dry mass.

The aggregate material is preferably from inert construction and demolition waste.

Percentage of/by Dry Mass

The percentages used to define the construction unit are percentages by dry mass.

Percentage by total dry mass is the ratio of one substance with mass (m) to the total mixture mass (M), defined as:

Percentage by dry mass=$m/M \times 100$

Where the mass is usual in grams or Kg.

Unfired

The making of traditional fired bricks and concrete blocks for use in construction is not environmentally friendly. Producing energy for firing is expensive and impacts on the environment.

Instead of being fired, the construction units of the invention are air-dried. As air-dried bricks do not have associated emissions from the production plant during manufacture, they have a much lower embodied energy (roughly $\frac{1}{10}^{th}$ that of traditional fired bricks). For example the average embodied energy for a traditional fired brick is approximately 3 MJ/kg as opposed to 0.44 MJ/kg for air-dried bricks.

Air-dried bricks can also help regulate humidity within a building. Academic research indicates that unfired masonry has a much higher potential to regulate the indoor humidity than conventional construction materials. Therefore, hygroscopic walls and ceilings as would be provided by the construction units described give substantial stability to indoor relative humidity. As a result of the benefits of this humidity buffering, using unfired masonry may reduce mould growth, reduce energy consumption of air conditioning and increase the durability of building materials.

Air dried bricks also have a higher thermal mass due to their density. For example, the air dried bricks may have thermal conductivities of approximately 0.38-0.74 W/mk. In contrast, fired concrete brick thermal conductivities range from 1.2-1.8 W/mk.

Additives

If a construction unit is to be used externally, pigment or other additive can be added to increase the waterproofing of the construction units. Pigments such as toners from recycled print cartridges may provide characteristics so that the construction unit does not absorb as much moisture as without inclusion of pigments.

Advantageously the pigment may enhance the intermolecular bond between the gypsum, clay and aggregate materials in the construction unit.

Suitably, such pigment may also provide colour to the units for aesthetic purposes.

Suitably pigment may be added to the construction unit in an amount of up to 15% by dry mass of the construction unit.

The pigment may be from recycled sources. For example, the pigment may be recycled from waste printer cartridges. Suitably the pigment may be obtainable from recycled toner cartridges in line with the environmental credentials of the invention.

The pigment particles may intersperse between the gypsum and clay provided in the construction unit. In embodiments, the inclusion of particular types of pigments for example recycled waste toner from printer cartridges may make the resulting construction units more resistant to water ingress and/or water transport through the construction unit. In embodiments, the pigment may have a particle size of 5 microns, 10 microns, 15 microns, or 20 microns.

The pigment can be added in a quantity of 1-30% of total dry mass of the construction unit, preferably, between 5 to 20%.

Excluded Materials

For environmental reasons, cement may be excluded from the construction unit. Cement production for use in concrete blocks requires huge amounts of energy. It would therefore be preferable to have an unfired brick and/or a brick which did not include cement.

For reasons of strength and function, other materials may be excluded from the construction unit. For example, organic material such as sewage may be excluded. Using organic material means the constituents of the construction unit are not well defined and may cause the resulting construction unit to be unstable due to decay. Furthermore, the organic material may cause the construction unit to have an unattractive smell. Organic material may be defined as carbon-containing substances formed by living organisms.

Added salt, for example, in the form of sea salt may also be excluded as it causes the resulting construction units to stain, particularly in wet conditions. More importantly, salt may also leak out of the construction unit, causing degradation of nearby mortar and thus structural damage.

Other substances, for example tar and/or fly ash, may also be excluded from the construction unit. Tar is toxic. Furthermore, tar is not environmentally friendly thus not in keeping with the green credentials of the construction unit described.

Method

In the method of manufacturing the construction unit, the method can comprise pre-processing/pre-treatment of the gypsum prior to use in the method.

In embodiments, pre-treatment of waste plasterboard to provide gypsum for use in the method of manufacture of the construction units of the present invention includes; shredding, crushing, and/or air separation processes to produce a coarse grade material with particle size distribution 0.063-16 mm for example, as specified by Table 1, PAS 109:2013 Specification for the production of reprocessed gypsum from waste plasterboard.

Further pre-treatment of the plasterboard may be provided using grinding, for example using a hammer mill to grind and screen the gypsum to provide coarse grade material in with a particular material particle size distribution 0.063-2 mm for example, as specified by Table 1, PAS 109:2013 which can be found at https://www.gov.uk/government/publications/recycled-gypsum-from-waste-plasterboard-quality-protocol/recycled-gypsum-from-waste-plasterboard-quality-protocol.

Additionally, the gypsum can be sieved though a 600 μm before being used in the method.

Preferably the moisture content of the gypsum is reduced so that the gypsum forms a hemihydrate state. Lowering the moisture content of the waste gypsum improves its microstructure properties resulting in a smaller void fraction and better mechanical properties. This in turn improves the strength in the construction unit.

To reduce the moisture content, gypsum may be heated at between 80-250° C.; 80-200° C.; 80-150° C.; or 100-150° C. The gypsum may be heated at these temperatures for 1-2 days, approximately 1 day; 6-24 hours; 12-24 hours; 18-24 hours; 6-18 hours; or 6-12 hours. For example, the gypsum may be heated at approximately 150° C. for approximately 24 hours; or a higher temperature, for example 200° C., could be used for less than 24 hours. Alternatively or additionally, pressure may be used to reduce the moisture content of the gypsum.

Gypsum in its hemihydrate form has lost 75% of its water content. Therefore, to test if the gypsum has reached its hemihydrate state, the gypsum may be weighed before and after heat and/or pressure treatment. The water loss of the gypsum based on the weight loss after treatment can then be calculated. For example: The molecular weight of gypsum $CaSO_4 \cdot (H_2O)_2 = 172.64$. The water makes up 34.014 g of this molecular weight. Upon heating, the water content reduces. When the water percentage is around 5% of the gypsum, the gypsum reaches its hemihydrate state. That is, if the gypsum initially weighed 172.64 g before heating. After heating, the gypsum molecular weight will be approximately 147 g (138.6 of gypsum and 8.6 g of water) if the hemihydrate state has been achieved.

Pre-processing/pre-treatment of one or more of the other components (clay or aggregate) may also, alternatively be carried out.

For example, the components may be sorted by particle size. This can be done by sieving the components to control the particle size used for manufacture of the construction units.

In the embodiments, in pre-processing, clay can be broken down (for example using a hammer drill) and passed through a 150 μm sieve. The clay particle size may vary up to a maximum of 0.002 mm One or more of the other components (clay or aggregate) of the construction unit may be dried prior to mixing. Drying helps ensure the moisture content in the finished brick unit is controlled and optimised for improved performance characteristics.

Suitably drying of the other components (clay or aggregate) for use in the manufacture of the construction unit may be carried out in an oven. The temperature of the oven for drying may be around 105° C. For example, in embodiments the drying may be carried out at a temperature of 60, 65, 70, 75, 80, 85, 90, 95, 100, 105 or 110° C. for at least 24 hours. Drying may be carried out in as specified by British Standard BS-EN 772-1, Methods of Test for Masonry Units for construction units with clay soils.

Drying may be carried out from 1 hour to overnight depending on the initial moisture content of the component. For example, drying of aggregate may be overnight or for 6-24 hours at 105° C. Drying of clay may be 6-24 hours at 105° C.

Once dried, the components can be stored in airtight containers to ensure the components are not rehydrated by ambient moisture in the air.

Suitably, the moisture content of the components of the construction unit can be tested before mixing. Depending on the initial moisture content of the components, drying of the components may not be needed, and/or the amount of water added to the mixture may be adjusted to take into account the moisture content of the components during manufacture of the construction unit. A moisture content of 8-40%, for example 12-26%, of total dry mass of construction unit may be reached prior to mixing.

The method used to test the components for moisture content, can be using any suitable method as known in the art, for example in the laboratory to determine the moisture content of the clay, gypsum or aggregates, a sample of the material can be taken and weighed, then oven dried at 105° C. for 24 hours before being weighed again. The difference in mass allows for the moisture content to be calculated (moisture content is the mass of the water divided by the mass of the dry solids). Alternatively, a moisture sensor can be used to determine the moisture content of the materials.

Suitably, the components gypsum, aggregate materials and clay are mixed, until a homogenous mixture is reached.

An additive, for example a pigment such as a toner, may also be added to the gypsum, clay and aggregate materials.

After mixing to disperse the gypsum, clay and aggregate materials and form a substantially homogeneous mixture, the mixing is stopped and water is added to the mixture. The gypsum, clay and aggregate mixture is then mixed with the water. This mixing may take, for example 1 minute.

The mixing can be done by a mechanical mixer or may be manually mixed.

Suitably, during the manufacture of the construction unit, water is added to the mixture until the mixture has water/moisture content in the range 8-40%, for example 12-26%, of total dry mass of the construction unit.

The construction unit can then be compressed, compacted or extruded. Following compression, compaction or extrusion, the construction unit can be air dried until equalisation of the internal moisture and relative humidity of the air is reached.

In embodiments, in the method, the gypsum, clay and aggregate mixture may have a final water/moisture content of 12-26% prior to being placed in a mould (e.g. stainless steel mould).

Suitably, the mixture may be poured into the mould in a single step or incrementally. This can help avoid the development of air gaps which may occur in the corners of the mould. The use of a vibrating plate may also avoid the development of air gaps. The mixture is then compacted in the mould. Alternatively, compaction can be carried out using a mechanical press. For example, a steel insert can be placed on top of the mixture inside the mould to enable a uniform pressure across the surface. The mould, filled with the mixture, can then be positioned under the mechanical press, and subjected to a minimum 10 kN force. This achieves full compaction in a single layer. Suitably, the top surface of the mixture in the mould may be leveled before compaction occurs.

Compaction can be carried out manually or automatically.

In an alternative methodology a construction unit of larger size can be compacted in multiple layers. Each layer is compressed as per the process described above, but instead is subjected to a force before the addition of the subsequent layer of mixture. Additionally, between layers, scattering of the top surface may be required to ensure adequate bonding of layers.

Once compaction is complete, bulk density can be calculated knowing the mass and volume of the construction unit.

Following compaction, the gypsum, clay and aggregate mixture may be left in the mould for 4 hours or more.

The mould is then removed and the construction unit is left to air dry or "air cure", for example for a minimum of 24 hours, 48 hours, 3, 4, 5, 6, 7, 8, 9, 10, 12, 14, 16, 18, 20, 22, 24, 26 or 28 days depending on the exact protocol followed and the inclusion of additives. Air drying (or curing) is an alternative to firing. Air drying involves leaving the compacted, compressed or extruded construction unit in the open air to dry for a period of time. The air drying or curing is preferably done in a manner that ensures sufficient airflow around all surfaces of the construction unit. For example, a rack may be used.

The air cure can be performed at ambient temperature (e.g. at room temperature between 4-35° C.). Suitably the air can have moisture content depending on relative humidity.

Suitably the progress of the air curing can be monitored by weighing the construction unit. In the embodiments, when the weight of the construction unit does not significantly change, for example when measured over 2 or more days, the construction unit is ready for use.

Typically, for example when the total mass of the construction unit does not experience significant additional loss of mass of water; the unit has reached the curing time.

In the embodiments, a construction unit of the present invention can have compressive strength from 1 to 20 $N/mm^2$.

Preferably, in the embodiments the compressive strength of a construction unit can be between 8 and 15 $N/mm^2$.

For example, the mean compressive strength per unit may be 4, 5, 6, 7, 8, 9, 10, 11 or 12 $N/mm^2$.

In the embodiments, the construction unit can be used on the external face of a building. The construction unit can also be used for the internal walls of a building. The construction unit can be used as a structural unit.

Raw Mix

A raw mix for making a brick comprises the gypsum, clay and aggregate materials. The water content of the raw mix can be calculated and the mix then used with additional water if necessary according to the method above. The mix may be sealed in an air-tight container with water content calculated and displayed on the container such that the raw mix is ready for use with only the indicated water amount to be added.

EXAMPLES

Example 1—Method of Manufacturing a Construction Unit in a Laboratory

An example of the production process to provide a construction unit is provided below. Suitably, the manufacture can include five stages.

a) preparing the components;

b) weighing out the components;

c) mixing the components;

d) compaction; and e) finishing.

Preparing Materials

When the raw components arrived, initial preparations were carried out in order to achieve consistency within each construction unit produced.

The gypsum was passed through a 600 μm sieve using a vibration plate. All material passing through the sieve, landing on the baseplate, was used in construction unit production. This material was placed in an oven at 140° C. for 8 hours before commencing the next stage. The gypsum typically then has 25% of the initial water contained within its chemical structure. That is, the gypsum is in its hemihydrate form.

Mineral demolition waste can provide recycled, washed aggregates and sand forming the aggregate components; gravel, coarse and fine sand. These components are typically placed in an oven at 105° C. for 24 hours to ensure all moisture has left the material.

Typically, clay for use in the construction units arrived unbroken in large clumps. Before it was broken down, the clay was dried in an oven at 105° C. overnight. Large clumps were broken down using a hammer drill or equivalent until the material passed through a 150 μm sieve. This fine clay was then dried out overnight at 105° C. to remove any moisture present.

Once cooled, the dried components were placed in an air tight container ready for use.

Addition of Materials

In order to gain consistency from unit to unit, each dried component was weighed out precisely. Table 1 shows the initial mixture components of two construction units (bricks) produced.

TABLE 1

Mixture components of a construction unit of the invention.

| soil type (British Standard Classification) | Particle Size (mm) | % of total dry mass | |
|---|---|---|---|
| fine sand | 0.06-0.2 | 6 | 5 |
| medium sand | 0.2-0.6 | 17 | 16 |
| coarse sand | 0.6-2.0 | 20 | 19 |
| fine gravel | 2.0-6.0 | 26 | 24 |
| medium gravel | 6.0-20.0 | 6 | 6 |
| clay | 0-0.15 | 10 | 9 |
| gypsum | 0.15-0.30 | 15 | 14 |
| toner (additive) | 0.09 | 0 | 7 |

The final brick had a mass around 2700 g. The total mass may change as the moisture may change, depending on relative humidity conditions.

In order to achieve a homogenous mixture, the components were added together in order of largest particle size to smallest as listed in Table 1. Suitably, for forming a test construction unit the manufacturing method can comprise;
1. Place small stainless steel bowl on scales and zero
2. Weigh out gravel component into bowl with tolerance of +1-1 g
3. Place gravel component into mixing bowl
4. Repeat steps 1-3 for all other dry materials in order shown
5. Weigh out water using steps 1-3 and set aside Mixing Components The mixing process ensures a homogenous mixture which allows for good compaction of the mixture to form the construction unit. Initially, once weighed out, all dry materials were mixed using a mechanical mortar mixer for 30 seconds until a homogeneous mixture was reached. The mixer was stopped and the water was added, if required, to reach the desired moisture content of 12-26% of total dry mass before mixing for a further one minute. As the mixture sets quickly it is important to remove the material immediately and begin the compaction process.

Compaction

Once the mixture, including the water, was homogenously mixed ready for compaction, a mechanical press or equivalent was used to provide such compaction. The mixture was placed in a stainless steel brick mould using a metal scraper in increments to push the mixture into the corners of the mould, with a level top surface before compaction. Once full the mould was placed under the compaction machine and a steel insert is placed inside brick mould to ensure uniform pressure was achieved. The mechanical press exerts a 10 kN force upon the mixture ensuring compaction in a single layer.

The construction units may be manufactured in different shapes as desired.

Finishing

Once compacted, the construction unit (brick) was ready to be finished using the same scraper. During compaction, surplus water diffused to the top surface allowing the top surface to be smoothed off by pressing down on the scraper and pulling it across the top of the brick. This process achieved a smooth flat finish along the top of the unit/brick and was repeated in both directions. The unit/brick was then left in the mould for an hour before its removal. Once the mould was removed the unit/brick was left to dry at normal atmosphere i.e. (15° C.-20° C.) or a minimum of 14 days, but potentially up to 28 days. This air drying caused the unit/brick to reach ambient temperature and moisture content.

The construction unit may have different surface finishes as desired.

Example 2—Compressive Strength

Figure 1:
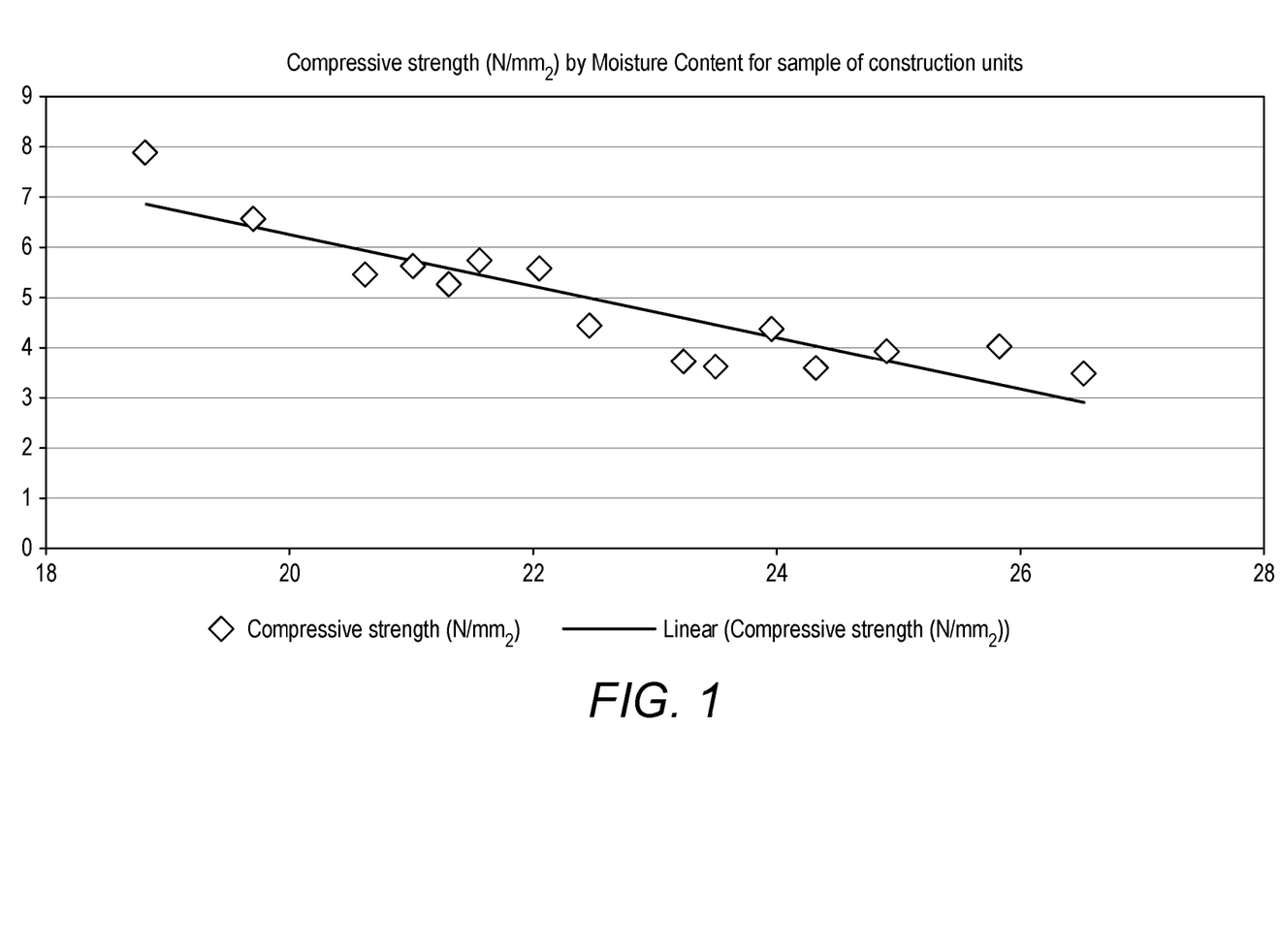
FIG. 1 provides a graph of the compressive strength of construction units of the invention according to moisture content.

Details of the compressive strength characteristics of various units/bricks are outlined in tables 2-4 below. Additionally, FIG. 1 shows the compressive strength of units/bricks by moisture content.

TABLE 2

Comparing compressive strength of construction units with and without toner

| soil type (British Standard Classification) | Particle Size (mm) | % of total dry mass | |
|---|---|---|---|
| fine sand | 0.06-0.2 | 6 | 5 |
| medium sand | 0.2-0.6 | 17 | 16 |
| coarse sand | 0.6-2.0 | 20 | 19 |
| fine gravel | 2.0-6.0 | 26 | 24 |
| medium gravel | 6.0-20.0 | 6 | 6 |
| clay | 0-0.15 | 10 | 9 |
| gypsum | 0.15-0.30 | 15 | 14 |
| Additive | 0.09 | 0 | 7 |
| Unconfined Compressive Strength (N/mm$^2$) | | 10 | 8 |

The particle distribution of the brick of table 2 without toner is shown in FIG. 3. This figure shows the brick has a well-graded particle distribution. That is, a brick where plotting the aggregate particle size against the percentage passing results in a curve which is generally constant over the full range of particle sizes such that there is no deficiency or excess of any particular aggregate particle size.

TABLE 3

Comparing the compressive strength of construction units with different clays (Clay type A and clay type B)

| | Observed Compressive Strength Characteristics | |
|---|---|---|
| Clay Type | Max Strength (N/mm$^2$) | No. of bricks tested |
| Clay Type A (16-20% moisture content) | 9 | 28 |
| Clay Type B (16-20% moisture content) | 10 | 57 |

TABLE 4

Comparing the compressive strength of construction units with different percentages of components

| soil type | Particle Size (mm) | examples of other mixes | | | | | | | |
|---|---|---|---|---|---|---|---|---|---|
| fine sand | 0.06-0.2 | 6 | 6 | 6 | 6 | 6 | 6 | 6 | 6 |
| medium sand | 0.2-0.6 | 17 | 15 | 14 | 14 | 14 | 17 | 17 | 17 |
| coarse sand | 0.6-2.0 | 20 | 17 | 13 | 13 | 13 | 20 | 20 | 37 |
| fine gravel | 2.0-6.0 | 26 | 26 | 26 | 26 | 26 | 15 | 37 | 0 |
| medium gravel | 6.0-20.0 | 6 | 6 | 6 | 6 | 0 | 25 | 0 | 15 |
| clay | 0-0.15 | 15 | 10 | 5 | 30 | 36 | 7 | 10 | 10 |
| gypsum | 0.15-0.30 | 10 | 20 | 30 | 5 | 5 | 10 | 10 | 15 |
| toner (additive) | | 0 | 0 | 0 | 0 | 0 | 0 | 0 | 0 |
| Unconfined Compressive Strength (N/mm$^2$) | | 7 | 5 | 2 | 3 | 2 | 3 | 4 | 3 |

Example 3—Initial Rate of Water Absorption

The initial rate of water absorption was calculated according to the UK BS EN standard 772-11 ("Methods of test for masonry units Part 11: Determination of water absorption of AC, AAC, MS and NS masonry units due to capillary action and the initial rate of water absorption of clay masonry units").

After drying to constant mass, a face of the construction unit was immersed in water for a specified period of time (dependent on the type of construction unit being assessed, please see below). The masonry unit was re-weighed after immersion, and any increase in mass can be attributed to any water absorbed during the immersion period.

For clay masonry units only the "initial rate of water absorption" of the bed face was measured, as opposed to just "water absorption" for aggregate concrete (AC) and manufactured stone (MS) construction units. The latter two were consequently immersed for more extended periods of time (10 minutes compared to 60 seconds). As the construction unit contains a minimal amount of clay, the construction unit was also tested in accordance with the standards for AC and MS construction units. Immersion times for different types of construction unit are set out below:

Clay (High Density): 60+/−2 s

Aggregate Concrete: 10+/−0.2 min

Manufactured Stone: 10+/−0.2 min—shall not exceed 9.0 g/m² s

The results of this test are below in Table 5.

TABLE 5

| Description | Cwi [kg/(m² × min)] |
| --- | --- |
| Clay Type A | 1.52 |
| Clay Type B | 1.52 |
| Pigmented Unit A | 0.21-0.27 |
| Pigmented Unit B | 0.041-0.055 |

Example 4—Compliance with UK Standards (BS EN) for Construction Units

The following section describes a testing regime that was identified and used as part of the development of the construction units. The standards quoted below have been successfully followed and indicative results are presented.

TABLE 6

Test parameter and reference UK Standard

| Test Parameter | Reference Standard | Test Result |
| --- | --- | --- |
| Dimensions | BS EN 772-16 (2011) | After preparation, the length, width and height of the specimens, the thickness of shells and webs, depth of holes and plane parallelism of bed faces are measured with an appropriate device. Using a UK brick size of 215 × 102.5 × 65 mm, the bricks were measured as per the referenced standard to ensure that dimensions were within appropriate BS tolerance categories. |
| Gross Density | BS EN 772-13 (2000) | The Net Dry Density has been calculated as 1750 kg/m³ |
| Configuration | EN 1996-1-1 (2005) | No voids were present in the construction unit, therefore this unit was classified as Group 1. This means less than 25% formed voids within the brick. Solid blocks - "blocks which contain no formal voids". |
| Compressive Strength | BS EN 772-1 (2011) | See Example 2. |
| Fire Classification | EN 13501-1 (a.2009) | Based on BS 771-3:2011 (5.11 - Fire Classification), this material may be classed as A1 by default since "<1% mass of homogeneously distributed organic materials" are present. |
| (Initial) Water Absorption | BS EN 772-11 (2011) | See Example 3. |
| Active Soluble Salt Content | BS EN 772-5 (2001) | |
| Dimensions (Clay Standard) | BS EN 771-1 (Clay) | T1 (Class T1 means that when 10 bricks are measured, there is a tolerance of dimensions of ±3 mm as per the specified British Standard). |

TABLE 6-continued

Test parameter and reference UK Standard

| Test Parameter | Reference Standard | Test Result |
| --- | --- | --- |
| Dimensions (Aggregate Concrete Standard) | BS EN 771-3 (Aggregate Concrete) | D1 (Class D1 means that when 10 bricks are measured, there is a tolerance of dimensions of +3 mm, −5 mm on all dimensions as per the specified British Standard) |
| Dimensions (Manufactured Stone) | BS EN 771-5 (Manufactured Stone) | D1 (Class D1 means that when 10 bricks are measured, there is a tolerance of dimensions of +3 mm, −5 mm on all dimensions as per the specified British Standard) |

Example 5—Inclusion of Additives

The following standard tests were conducted on construction units in order to understand the effects of using recycled toner powder in the production of the unit:
a. Unconfined compressive strength testing
b. Active Soluble Salt Testing
c. Suction (water holding capability of the material) measurements These tests have been chosen due to standard UK and EU building regulation requirements.

The components used in the bricks were as listed in Table 2.

Soluble Salts Testing of Construction Unit

The measured concentrations of Sodium ($Na^+$) and potassium ($K^+$) as a percentage of the original mass and the sum of them are tabled below.

TABLE 7

Concentrations of Sodium (Na+) and potassium (K+) and the sum of them as a percentage of the original mass

| Sample | $Na^+$ % by mass | $K^+$ % by mass | Active Soluble Salt Content |
| --- | --- | --- | --- |
| Brick (no additive) | 0.007 | 0.003 | 0.01 |
| With additive | 0.007 | 0.003 | 0.01 |

A high concentration of soluble salts results in effervescence from brick walls of the salts present, usually seen in the form of a white deposit on the surface of the bricks. This is visually undesirable and can cause corrosion and/or degradation of the surrounding building materials. Thus, soluble salt testing is carried out.

All the samples tested have a concentration of 0.007% by mass $Na^+$ and 0.003 by mass $K^+$ and the sum total % by mass is 0.01%. Thus, the bricks tested meet the British Standard for Soluble Salt Testing as set out above in Table 7.

Unconfined Compressive Strength Tests

Bricks (both with and without toner pigment added in the mix) were tested from day 4 of air-drying, up until day 29, the day after the end of air drying process.

The following ranges of compressive strengths were found:
No additive—Brick compressive strength range: 5-10.4 N/mm2
Additive (toner powder)—Brick compressive strength range 5-7.9 N/mm2

Suction Measurements of Bricks with and without the Addition of Toner Powder.

Ten bricks were tested in order to investigate the suction profile (matric suction—water capillary action within the material as well as osmotic suction due to chemical reaction) of the bricks with and without toner powder. Of the ten bricks tested: four bricks contained no toner powder; three with a mixture of recycled toner powder at three different quantities (low, medium and high relating to a single amount of toner powder, then double the amount then quadruple the amount) added.

Results:

Based on material suction evolution over time tests, it is clear that the addition of pigment can increase the water holding capability of the units. Equalisation of the moisture and consequently of the measured suction within the units without pigment occurred around 14 days and it varied for units with pigment.

The invention claimed is:

1. A non-cement based construction unit usable in construction in an unfired state, the unit comprising gypsum, clay and aggregate materials, wherein the aggregate materials comprise three or more different size ranges of aggregate, and wherein the size ranges comprise at least one of a) 6-20 mm; or b) 2-6 mm; and at least one of c) 600 μm-2 mm; d) 200-600 μm and/or e) 60-200 μm; and wherein the gypsum is in the range of 5-35% of dry mass (w/w).

2. The construction unit of claim 1, wherein the clay is in the range of 5-40% of dry mass (w/w).

3. The construction unit of claim 1, wherein the aggregate materials comprise:
   a) 3-15% of dry mass aggregate of size approximately greater than 6 mm to 20 mm of dry mass (w/w);
   b) 20-30% of dry mass aggregate of size approximately greater than 2 mm to 6 mm of dry mass (w/w);
   c) 10-40% of dry mass aggregate of size approximately greater than 600 μm to 2 mm of dry mass (w/w);
   d) 10-30% of dry mass aggregate of size approximately greater than 200 μm to 600 μm of dry mass (w/w); or
   e) 3-15% of dry mass aggregate of size approximately 60-200 μm of dry mass (w/w);
   wherein the aggregate materials have a well-graded particle size distribution.

4. The construction unit of claim 1, wherein the aggregate of size 6-20 mm and/or aggregate of size 2-6 mm is gravel.

5. The construction unit of claim 1, wherein the aggregate of size approximately 600 μm-2 mm; 200-600 μm and/or 60-200 μm is sand.

6. The construction unit of claim 1, wherein at least one of the gypsum, clay and aggregate materials of the construction unit comprises recycled material.

7. The construction unit of claim 1, further comprising an additive, wherein the additive is a pigment.

8. The construction unit of claim 1, wherein the construction unit does not comprise tar.

9. A raw mix for making the construction unit of claim 1, wherein the raw mix comprises gypsum, clay and aggregate materials, wherein the aggregate materials comprise three or more different size ranges of aggregate, and wherein the size ranges comprise at least one of a) 6-20 mm; or b) 2-6 mm; and at least one of c) 600 μm-2 mm; d) 200-600 μm and/or e) 60-200 μm; and wherein the gypsum is in the range of 5-35% of dry mass (w/w).

10. A method of making a construction unit of claim 1 comprising:
   a) mixing the gypsum, clay and aggregate materials together;
   b) adding water to the mixed gypsum, clay and aggregate material such that water is provided in a range of 8-40% of dry mass of the mixed material (w/w);
   c) compacting, compressing or extruding the mixed material from step b; and
   d) allowing the mixed material from step c to dry.

11. The method of claim 10, comprising the further step of processing the gypsum to reduce its moisture content prior to mixing it with the clay and aggregate materials.

12. The method of claim 11, wherein the processing step comprises reducing the gypsum to form calcined gypsum.

13. The method of claim 11 wherein the processing step comprises heating or pressurizing the gypsum to reduce its moisture content.

14. The method of claim 13, wherein the heating is performed at a temperature of approximately 80-200° C. for 24 hours.

15. The method of claim 10, wherein the gypsum is recycled gypsum or flue-gas desulfurization gypsum.

16. The method of claim 10 wherein the method:
   a) does not include firing the construction units, and/or
   b) does not comprise adding tar to form the construction unit.

* * * * *